United States Patent
Noll

(10) Patent No.: US 6,582,334 B1
(45) Date of Patent: Jun. 24, 2003

(54) COMPRESSED-AIR-OPERATED DIFFERENTIAL LOCK OF A MOTOR VEHICLE AND METHOD OF MAKING THE SAME

(75) Inventor: Lothar Noll, Waiblingen (DE)

(73) Assignee: DaimlerChrysler AG, Stuttgart (DE)

( * ) Notice: Subject to any disclaimer, the term of this patent is extended or adjusted under 35 U.S.C. 154(b) by 35 days.

(21) Appl. No.: 09/691,190

(22) Filed: Oct. 19, 2000

(30) Foreign Application Priority Data

Oct. 19, 1999 (DE) .......................... 199 50 171

(51) Int. Cl.⁷ .......................... F16H 48/24; F16H 48/30
(52) U.S. Cl. .......................... 475/86; 92/170.1
(58) Field of Search .............................. 475/231, 235, 475/237, 240, 86; 92/169.1, 170.1, 171.1

(56) References Cited

U.S. PATENT DOCUMENTS

| | | | |
|---|---|---|---|
| 2,132,978 A | * 10/1938 | Stewart | 303/1 |
| 5,181,588 A | * 1/1993 | Emmons | 188/71.1 |
| 5,342,255 A | * 8/1994 | Slesinski et al. | 475/230 |
| 5,370,018 A | * 12/1994 | Kwasniewski | 180/24.09 |
| 5,673,777 A | * 10/1997 | Ziech | 192/108 |
| 5,947,252 A | * 9/1999 | Ziech | 192/109 R |

FOREIGN PATENT DOCUMENTS

| | | |
|---|---|---|
| DE | 34 27 791 | 1/1986 |
| DE | 34 36 312 | 4/1986 |
| DE | 37 28 280 | 6/1989 |
| DE | 40 38 731 | 6/1992 |

* cited by examiner

Primary Examiner—Rodney H. Bonck
Assistant Examiner—Ankur Parekh
(74) Attorney, Agent, or Firm—Crowell & Moring LLP

(57) ABSTRACT

A compressed-air-operated differential lock of a motor vehicle, which is arranged within a metallic rear-axle transmission housing part having a recess. A piston is arranged displaceably in the recess in relation to its longitudinal axis and so as to be capable of being supported on a first claw clutch half which is arranged fixedly in terms of rotation in relation to a shaft and so as to be capable of being coupled to a corresponding second clutch half. In order to provide a cost-effective differential lock, a plastic liner is inserted into the recess and receives the piston so as to guide the latter along said longitudinal axis and in which an elastomeric sealing ring is snapped in a way beneficial in mounting terms and seals off relative to the compressed-air interior.

9 Claims, 1 Drawing Sheet

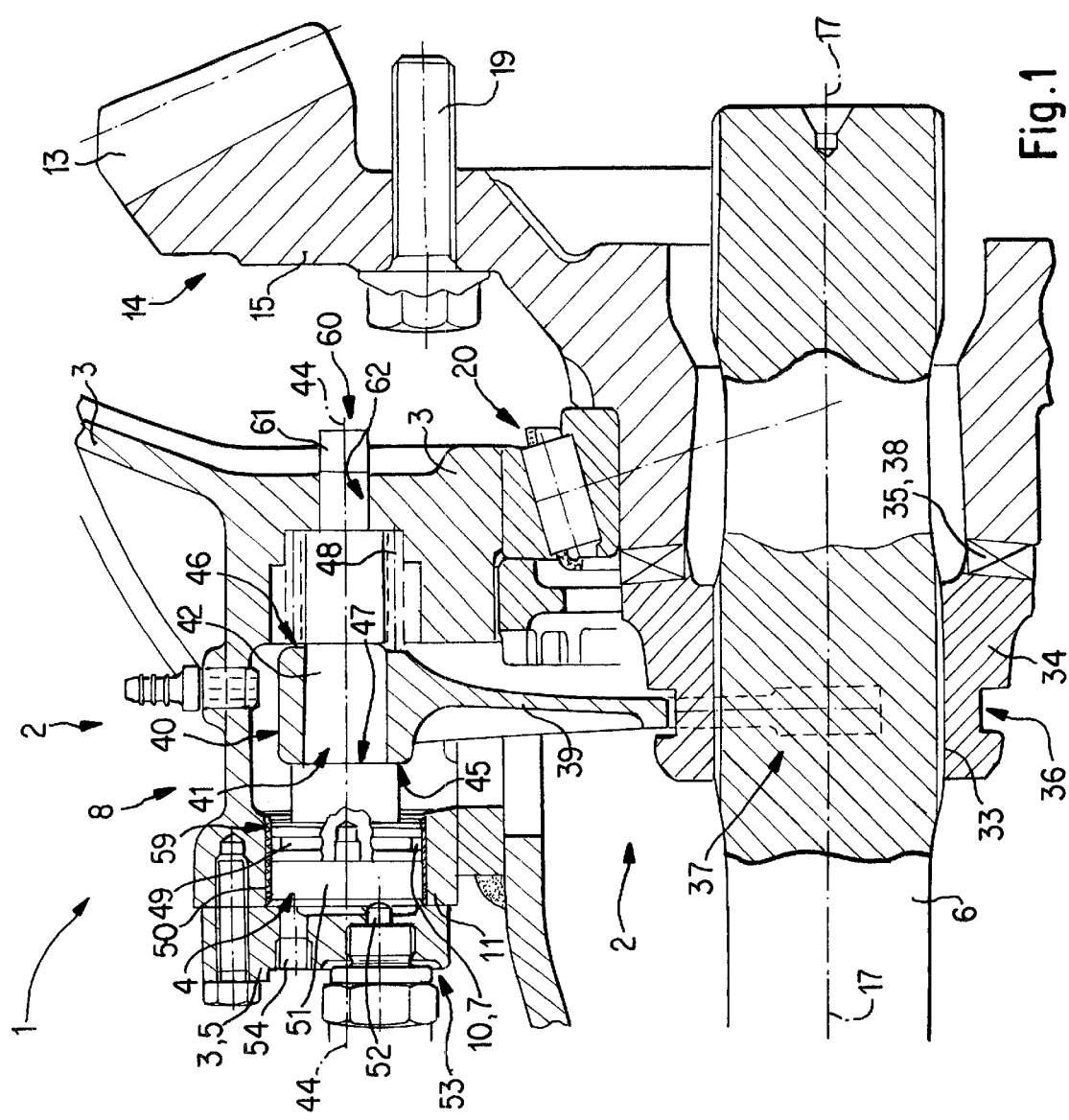

COMPRESSED-AIR-OPERATED DIFFERENTIAL LOCK OF A MOTOR VEHICLE AND METHOD OF MAKING THE SAME

This application claims the priority of German Patent Application 199 50 171.8, filed in Germany Oct. 19, 1999, the disclosure of which is expressly incorporated by reference herein.

BACKGROUND AND SUMMARY OF THE INVENTION

The invention relates to a compressed-air-operated differential lock of a motor vehicle. Preferred embodiments of the invention relate to such a differential lock which is arranged within a metallic rear-axle transmission housing having a recess, within which a piston is arranged displaceably in relation to its longitudinal axis and so as to be capable of being supported on a first claw clutch half which is arranged fixedly in terms of rotation in relation to a shaft and so as to be capable of being coupled to a corresponding second clutch half.

Such a differential lock is known from the heavy commercial vehicle Mercedes-Benz Actros. This differential lock comprises two clutch halves, by means of which a positive connection can be made in the usual way between a wheel drive halfshaft and a differential housing. The differential lock comprises a piston which is directly arranged longitudinally displaceably in a housing bore of the metal rear-axle transmission housing and which, when subjected to compressed air, can be engaged and, when relieved of compressed air, can be disengaged as a result of a spring force. For this purpose, the piston is sealed off on the circumference relative to the housing bore by means of an O-ring, and this housing bore must have a very high surface quality, in order, on the one hand, to have a corresponding sealing effect and, on the other hand, to protect the O-ring.

An object of the invention is to provide a cost-effective differential lock.

This object is achieved, according to the invention, by providing a differential lock of the above noted type wherein a plastic liner is inserted into the recess and receives the piston so as to guide the latter along said longitudinal axis.

One advantage of the invention is that the surface quality of the housing bore has to satisfy only very low requirements, so that complicated, costly and tool-wearing surface machining of the metallic transmission housing can be dispensed with.

Another advantage of the invention is that the operating reliability of the differential lock is appreciably improved, even under extreme environmental conditions with high atmospheric moisture, since moist compressed air cannot exert on the cylinder contact surface a corrosive influence which consequently increases the coefficient of friction.

A refinement of the preferred embodiments of the invention which can advantageously be mounted in a particularly simple and reliable way includes an arrangement wherein the plastic liner has an annular recess, in which is inserted a sealing ring which bears against a releasable component of the rear-axle transmission housing. Since the plastic liner and a sealing ring form a mounting unit, the possibility of "forgetting" to install the sealing ring or of making a positioning error under production and workshop conditions is reliably ruled out in a particularly advantageous way.

Further advantages of the invention may be gathered from the claims and from the description.

Other objects, advantages and novel features of the present invention will become apparent from the following detailed description of the invention when considered in conjunction with the accompanying drawings.

BRIEF DESCRIPTION OF THE DRAWINGS

FIG. 1 is a sectional schematic view of a differential lock constructed in accordance with a preferred embodiment of the invention; and FIG. 2 is an enlarged sectional view of a detail of FIG. 1.

DETAILED DESCRIPTION OF THE DRAWINGS

FIG. 1 shows a detail of a rear-axle transmission 1 of a commercial vehicle which comprises a differential lock 2. This rear-axle transmission 1 comprises a rear-axle transmission housing 3, within which are arranged a driving pinion, not illustrated in any more detail, a differential, two wheel drive halfshafts 6 and an actuator 8.

The following directional information, "front", "rear", "left", "right", relates to the direction of travel.

The driving pinion is mounted rotatably in the rear-axle transmission housing 3. A bevel wheel arranged at that end of the driving pinion which is located inside the housing has a toothing which engages into a toothing 13 of a ring gear 14.

This ring gear 14 is designed in one piece with a housing cover 15 of a transverse differential housing of the differential and is arranged coaxially to a geometric longitudinal axis 17. Next to this housing cover 15, the transverse differential housing comprises a housing bowl, not illustrated in any more detail, which is screwed to the housing cover 15 by means of screws 19. The transverse differential housing is mounted in the rear-axle transmission housing 3 rotatably and axially non-displaceably in relation to the longitudinal axis 17. For this purpose, both the housing cover 15 and the housing bowl are mounted in the rear-axle transmission housing 3 in each case by means of one of two tapered-roller bearings 20. Arranged in the housing bowl are two bores which are in alignment with one another and in which a differential bolt arranged perpendicularly to the longitudinal axis 17 is conventionally supported in the circumferential direction in relation to the longitudinal axis 17. Two differential pinions are arranged coaxially to the differential bolt so as to be rotatable in relation to the latter. These differential pinions have toothings which engage in the usual way in toothings of bevel wheels. These bevel wheels are arranged coaxially to the longitudinal axis 17 and are connected fixed in terms of rotation in each case to one of the two wheel drive halfshafts 6 by means of shaft/hub toothings.

The housing cover 15 has clutch claws 35 in the outlet region of the left wheel drive halfshaft 6. These clutch claws 35 arranged on the housing cover 15 form the first clutch half of the differential lock 2.

A sliding sleeve 34 arranged fixedly in terms of rotation, but axially displaceably in relation to the left wheel drive halfshaft 6, by means of a further shaft/hub toothing 33 has further clutch claws 38 which correspond to the clutch claws 35 of the housing cover 15. The differential lock 2 is illustrated in the locked state in the drawing. In this locked state, the clutch claws 38 assigned to the housing cover 15 are in engagement with the clutch claws 35 assigned to the sliding sleeve 34.

The sliding sleeve 34 has a circumferential groove 36, into which a rear end 37 of a shift fork 39 engages. This shift fork 39 has, at its front end 40, a bore 41, through which a piston rod 42 of the actuator 8 passes. The piston rod 42 of the actuator 8 is, in this case, arranged coaxially to an actuator longitudinal axis 44 which is arranged parallel and offset to the longitudinal axis 17. The shift fork 39 is limited axially at its front end 40, on both sides, by plane end faces 45, 46 arranged perpendicularly to the actuator longitudinal axis 44. The shift fork 39 is supported with the left end face 45 on a shoulder 47 of the piston rod 42. The shift fork 39 is supported with its right end face 46 on resilient force accumulator or a helical compression spring 48 which, in turn, is supported on the rear-axle transmission housing 3.

The piston rod 42 is connected at a first end 59 to a piston 49 which is guided displaceably in a plastic liner 50. This plastic liner 50 is pressed into a bore 4 of the rear-axle transmission housing 3, which bore is arranged coaxially to the piston 49 and is closed on the inside of the housing by means of the piston 49 and on the outside of the housing by means of a cylinder cover 5 screwed to the rear-axle transmission housing 3. A pressure space 51 is consequently enclosed within the plastic liner 50, said pressure space being sealed off on the same side as the piston 49 by means of an O-ring 7 which is received in a peripheral annular groove 10 of the piston 49. On the same side as the cylinder cover 5, the pressure space 51 is sealed off by means of an elastomeric ring 11 which is snapped into the plastic liner 50 by means of a catch connection 55 evident in more detail in FIG. 2.

At a second end 60, the piston rod 42 terminates in the form of an axial bearing journal 61 which is arranged longitudinally displaceably in a bearing bore 62 of the rear-axle transmission housing 3.

The pressure space 51 is connected to a compressed-air supply line, not illustrated in any more detail, by means of a supply-line bore 54 which runs through the cylinder cover 5 of the rear-axle transmission housing 3. The compressed-air supply line has a solenoid valve, by means of which the pressure space 51 can be subjected to compressed air and can be relieved of this.

An axially displaceable switching button 52 of a check-back switch 52 projects into the pressure space 51. This switching button 52 is actuated as a result of the axial displacement of the piston 49. A "DIFFERENTIAL CLUTCH ENGAGED" signal appears at the check-back switch 53 when the differential lock 2 is in the engaged position illustrated in the drawing. By contrast, when the differential lock 2 is in the disengaged position not illustrated in the drawing, the switching button 52 is actuated and a "DIFFERENTIAL CLUTCH DISENGAGED" signal appears at the check-back switch 53.

FIG. 2 shows a detail of the plastic liner 50 in the region of the catch connection 55 and the elastomeric sealing ring 11, the plastic liner 50 being in the demounted state.

The elastomeric sealing ring 11 has, on its left side, a sealing lip 56 which, when the plastic liner 50 is in the installed state, bears sealingly against a machined face of the cylinder cover 5, and has, on its right side, an annular bead 57 which forms the positive catch connection 55 with an annular recess 58 of the plastic liner 50.

In this case, a driver's cab, not illustrated in any more detail, of the commercial vehicle has arranged in it a lock switch, by the actuation of which into the "ON" position, the vehicle driver expresses the wish to engage the differential lock 2, that is to say to bring the two clutch claws 35, 38 into engagement with one another. By manual actuation into the "OFF" position, the vehicle driver expresses the wish to disengage the differential lock 2.

In a further refinement of the invention, the supply-line bore is arranged so as to run radially outwards in an axial region of the pressure space, the plastic liner having a recess in this region.

In further embodiments, a plastic liner may be inserted into a rear-axle transmission housing recess which is shaped in any desired way, even being unmachined.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. Compressed-air-operated differential lock of a motor vehicle, which is arranged within a metallic rear-axle transmission housing having a recess, within which a piston is arranged displaceably in relation to a longitudinal axis and so as to be capable of being supported on a first claw clutch half which is arranged fixedly in terms of rotation in relation to a shaft and so as to be capable of being coupled to a corresponding second clutch half, wherein a plastic liner is inserted into the recess and receives the piston so as to guide the piston along said longitudinal axis.

2. Compressed-air-operated differential lock of a motor vehicle according to claim 1, wherein the piston is capable of being supported in the direction of the longitudinal axis, at least indirectly, on a resilient force accumulator.

3. Compressed-air-operated differential lock of a motor vehicle according to claim 1, wherein the longitudinal axis of the piston is arranged so as to be parallel and offset to a shaft longitudinal axis of the shaft, the piston being capable of being supported on the first clutch half by way of a fork.

4. Compressed-air-operated differential lock of a motor vehicle according to claim 2, wherein the longitudinal axis of the piston is arranged so as to be parallel and offset to a shaft longitudinal axis of the shaft, the piston being capable of being supported on the first clutch half by way of a fork.

5. Compressed-air-operated differential lock of a motor vehicle, which is arranged within a metallic rear-axle transmission housing having a recess, within which a piston is arranged displaceably in relation to a longitudinal axis and so as to be capable of being supported on a first claw clutch half which is arranged fixedly in terms of rotation in relation to a shaft and so as to be capable of being coupled to a corresponding second clutch half, wherein a plastic liner is inserted into the recess and receives the piston so as to guide the piston along said longitudinal axis, wherein the plastic liner has an annular recess, in which is inserted a sealing ring which bears against a releasable component of the rear-axle transmission housing.

6. Compressed-air-operated differential lock of a motor vehicle according to claim 2, wherein the plastic liner has an annular recess, in which is inserted a sealing ring which bears against a releasable component of the rear-axle transmission housing.

7. Compressed-air-operated differential lock of a motor vehicle according to claim 3, wherein the plastic liner has an annular recess, in which is inserted a sealing ring which bears against a releasable component of the rear-axle transmission housing.

8. A method of making a compressed-air-operated differential lock of a motor vehicle of the type which is arranged within a metallic rear-axle transmission housing having a recess, within which a piston is arranged displaceably in relation to a longitudinal axis and so as to be capable of being supported on a first claw clutch half which is arranged fixedly in terms of rotation in relation to a shaft and so as to be capable of being coupled to a corresponding second clutch half, said method comprising:

forming a plastic liner, and inserting the plastic liner into the recess to receive and guide the piston along the longitudinal axis.

9. A method according to claim 8, wherein the plastic liner has an annular recess, in which is inserted a sealing ring which bears against a releasable component of the rear-axle transmission housing.

* * * * *